US008738695B2

(12) United States Patent
Smith et al.

(10) Patent No.: US 8,738,695 B2
(45) Date of Patent: May 27, 2014

(54) JOINT ANALYSIS OF SOCIAL AND CONTENT NETWORKS

(75) Inventors: John Richard Smith, New Hyde Park, NY (US); Jelena Tesic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1745 days.

(21) Appl. No.: 11/748,716

(22) Filed: May 15, 2007

(65) Prior Publication Data

US 2008/0288596 A1 Nov. 20, 2008

(51) Int. Cl.
G06F 15/16 (2006.01)

(52) U.S. Cl.
USPC .......................................... 709/204

(58) Field of Classification Search
USPC .......................................... 709/204
See application file for complete search history.

(56) References Cited

U.S. PATENT DOCUMENTS

| | | | |
|---|---|---|---|
| 6,834,195 B2 * | 12/2004 | Brandenberg et al. | 455/456.3 |
| 7,526,458 B2 * | 4/2009 | Flinn et al. | 706/12 |
| 7,526,459 B2 * | 4/2009 | Flinn et al. | 706/12 |
| 7,539,652 B2 * | 5/2009 | Flinn et al. | 706/12 |
| 2006/0173838 A1 * | 8/2006 | Garg et al. | 707/5 |
| 2006/0218153 A1 * | 9/2006 | Voon et al. | 707/10 |
| 2007/0028266 A1 * | 2/2007 | Trajkovic et al. | 725/46 |
| 2007/0097959 A1 * | 5/2007 | Taylor | 370/352 |
| 2007/0226315 A1 * | 9/2007 | Espelien | 709/217 |
| 2008/0016205 A1 * | 1/2008 | Svendsen | 709/224 |
| 2008/0052371 A1 * | 2/2008 | Partovi et al. | 709/217 |
| 2008/0137668 A1 * | 6/2008 | Rodriguez et al. | 370/400 |
| 2008/0215581 A1 * | 9/2008 | Messing et al. | 707/6 |
| 2008/0270038 A1 * | 10/2008 | Partovi et al. | 702/19 |

OTHER PUBLICATIONS

Golder et al., "Usage Patterns of Collaborative Tagging Systems," Journal of Information Science, vol. 32, No. 2, Apr. 2006, pp. 198-208.
Tesic et al., "Semantic Labeling of Multimedia Content Clusters," IEEE International Conference on Multimedia and Expo, Jul. 2006, pp. 1493-1496.

* cited by examiner

Primary Examiner — Thu Nguyen
(74) Attorney, Agent, or Firm — Yee & Associates, P.C.; Preston Young

(57) ABSTRACT

A method and apparatus is provided to analyze social and content networks, to identify new relationships among users and content, and to more effectively link users to content. Embodiments of the invention also facilitate more relevant searches over both social and content data. One embodiment is directed to analyzing integrated social and content networks, and includes specifying a social network comprising multiple user nodes, and specifying a content network comprising multiple multimedia content nodes. Data elements associated with respective nodes of the user and content networks are analyzed, in order to detect a set of nodes comprising at least first and second user nodes and first and second content nodes, and to further detect at least three commonality links that join all the nodes of the set together. It is also determined whether a further link is a valid commonality link. The further link is initially inferred to extend between two of the nodes in the set, and to cooperatively join with the three identified commonality links to form a closed loop.

20 Claims, 6 Drawing Sheets

JOINT ANALYSIS OF SOCIAL AND CONTENT NETWORKS

BACKGROUND OF THE INVENTION

1. Field of the Invention

The invention disclosed and claimed herein generally pertains to a method and apparatus for linking together users of a social network with objects of a multimedia content network, in order to consider possible new relationships between the users and objects. More particularly, the invention pertains to a method of the above type that analyzes multiple linkages and relationships among the users and objects of the respective networks. Even more particularly, the invention pertains to a method of the above type that improves targeting of content delivery to users, and uses linkage analysis to enhance connections among users.

2. Description of the Related Art

Online communities are increasingly being formed into dynamic social networks that provide rich channels for interaction and communication among network users. There is great wealth of information contained within the relationships and links that make up these social networks. Moreover, global, distributed, multi-source multimedia (e.g., image, video and audio) information dissemination, such as through the Internet, wireless phones, and television, produces ever increasing amounts of content that is targeted to users. However, currently available solutions for connecting users to content rely mainly on matching user profiles or preferences to metadata that describes the content, or use recommendation systems such as collaborative filtering. Collaborative filtering is a method of making automatic predictions (filtering) about the interests of a user by collecting taste information from many users (collaborating).

A drawback with the above currently available solutions is that they tend to require explicit creation of user profiles, or else they must have sufficient past history to effectively observe access patterns. Also, relying on a scoring or rating system that is averaged across an entire user base ignores the specific demands of the individual user. This approach is particularly deficient when used for tasks in which there is large variation in interest, such as making recommendations for movie titles or the like to a large and disparate user base.

Another emerging trend in social networks is crowd sourcing collaborative tagging of shared multimedia content. In collaborative tagging, metadata is generated by both the creators and the consumers of particular content, rather than by a single individual. The term metadata, as used herein, can include but is not limited to information pertaining to artifacts or other data, such as source, name, alt tag, attributes, the name of the collection to which the artifact belongs and/or its general purpose. The collaborative tagging approach has shown value, in supporting user access to online multimedia content through various recommendation systems in interactive social communities. Golder and Huberman, in *"Usage Patterns of Collaborative Tagging Systems"*, Journal of Information Science, Vol. 32 (2), 2006, showed that there are common social patterns to be discovered in collaborative tagging systems. As they analyzed a structure of these systems, they discovered regularities such as in user activity and tag frequencies. However, numerous technical problems still remain for effectively leveraging user communities from multimedia content enrichment, using collaborative tagging. These include dealing with ambiguity and synonymy in tags, and lack of vocabulary control.

Generally, the subject of achieving rich multimedia information linkage over multiple content sources has been largely ignored. With the growing variety of distribution channels for open source multimedia, the boundaries between different types of multimedia content domains are loosening. Nonetheless, existing content linking services tend to be of very narrow scope, and are typically based on associated metadata such as user, video title and related comments (e.g. YouTube, copyright © 2007 YouTube, Inc., or MySpace, © 2003-2007 MySpace.com.). As a result, information contained in the audio, visual and temporal dimensions of the multimedia content, and in their inherent semantic relationships, has not been significantly exploited. On the other hand, recent multimedia understanding research has produced significant results for automatic tagging of image, video and audio content, and using multimedia content analysis tools. For example, Tesic and Smith, in *"Semantic Labeling of Multimedia Content Clusters"*, IEEE International Conference on Multimedia and Expo (ICME), 2006, extended the scope of video summarization in a way that allows users to much more efficiently navigate the semantic and metadata space of the video data set.

It is anticipated that the relationships of a social network could be used to improve and enhance efforts to connect users to content networks and repositories. However, in the past little effort has been devoted to predicting important patterns and deriving relevant links in joint social and content space. Currently available techniques, including those discussed above, pertain to social and content links that are substantially limited to specific content and user domains. Such techniques include: (i) collaborative filtering, recommendation system and preference elicitation methods of connecting content to the users of social networks; (ii) social network analysis and collaborative portal invitations for user-to-user connections; and (iii) clustering and similarity searches in the visual space or associated metadata space (e.g., picture search based on tagging, file name and camera metadata), for content-to-content connections. However, in the present age of information explosion, each of these techniques, while useful, tends to be insufficient in view of the extremely large number of items that can now be found in even a single content category.

SUMMARY OF THE INVENTION

The invention is generally directed to analyzing social networks and content networks, in order to identify new relationships among users and content, and to more effectively link users to content. Embodiments of the invention recognize that social links can help identify commonalities among groups of users, while content analysis can identify clusters or groups of content that share properties, e.g., visual features and semantics. By better understanding the relationships and links among users and content, connection of users to content can be significantly enhanced, and new relationships among users and among content can be detected and made use of. Embodiments of the invention can also facilitate cross-domain connection of social and content networks. Correlating the links within and across content and social networks (horizontal search space) can result in more effective integrated searches over both social and content spaces.

One embodiment is directed to a method for analyzing integrated social and content networks, wherein the method includes the steps of specifying a social network comprising multiple user nodes, at least some of the user nodes being joined to one another by internal links, and specifying a content network comprising multiple content nodes, at least some of the content nodes comprising multimedia content. The method also comprises analyzing data elements associated with respective nodes of the user and content networks, in order to identify a set of nodes that comprise at least first and second user nodes and first and second content nodes, wherein two of the nodes comprise end nodes. The method further analyzes the data elements to identify at least three commonality links that collectively join all the nodes of the set together, into a structure that defines an open loop extending between the end nodes. The method additionally includes determining whether a further link is a valid commonality link, wherein the further link is initially inferred to extend between the two end nodes of the set, and to cooperatively join with the at least three identified commonality links to form a closed loop.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

In accordance with the invention, it has been recognized that if social networks and multimedia content networks are brought together, there can be significant opportunities for gaining new insights into user and machine tagging of multimedia content, and also into the relationships created thereby. These include user-and-content, user-and-user, and content-and-content relationships, which all provide new ways for users to organize, share and consume online multimedia content. An efficient and scalable solution for such linking is disclosed herein, to ensure more efficient content delivery to users. This solution offers the opportunity to improve access of users to multimedia repositories, and also to improve targeting of content to users.

In an embodiment of the invention, a technique is provided that jointly analyzes information from social and content networks, and identifies new and/or filters out irrelevant relationships among users. This technique can also be used to fill in semantic gaps in content, by extracting missing information from semantically similar content. Multimedia objects can have different associated structured or unstructured textual information, and users can be (a) producers, (b) publishers, (c) routers, and (d) accessers of the content.

A core idea in embodiments of the invention is to correlate social and content networks, in order to better understand the existing links within both the social and content networks, and also between content and user nodes of the two networks. Results of the correlation can then be used to detect and confirm the validity of new links and relationships, within and between the networks, and can also be used to filter out relationships that are not supported or valid. As a first step, a social network is constructed among users, and a content network is constructed among multimedia content objects. Then, links are constructed between users of the social network and objects or data elements of the content network. As a final step, new relationships are inferred, and then either confirmed or filtered out, based on the detected overlap between the social and content networks.

Figure 1:
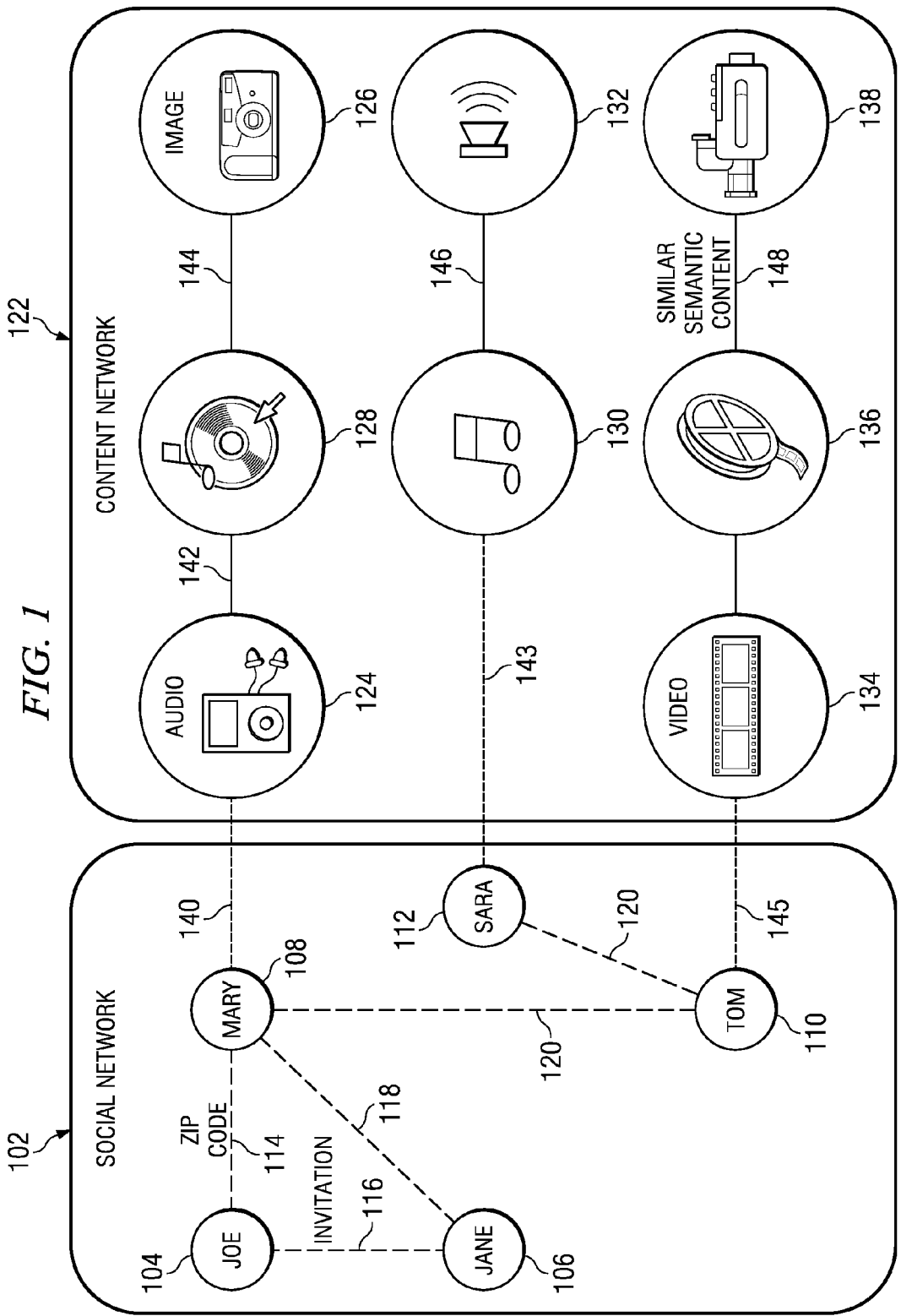
FIG. 1 is a schematic diagram illustrating links or relationships within and between social and content networks.

Referring to FIG. 1, there is shown a social network 102, constructed as a relational graph. More particularly, social network 102 depicts the relationships between nodes 104 and 110, which respectively represent individual named users or user profiles. The user nodes are related or linked by means of commonality links or linkages 114-120. It is to be understood that links between user nodes are established herein by determining that both nodes are part of the same circle of friends, or have some other common social relationship. Alternatively, the nodes are joined together by a recommendation system, such as collaborative filtering or other approach as described above. By way of example and not limitation, such links could result from users having the same zip code, the same school, the same business, or who are all recipients of a common invitation (e.g., persons of retirement age who all receive invitations to attend a particular retirement planning seminar). Further examples of social network 102 include collaboration portals, whereby users join groups or establish links to friends, family and peers, and interact and communicate with each other. As used herein, the term "collaboration portal" means a portal of a network such as the Internet that can be accessed by all users that share and are linked together by a common interest or relationship.

While FIG. 1 shows user nodes 104, 106 and 108 joined directly to one another by links 114, 116 and 118, nodes 108 (Mary) and 112 (Sara) are indirectly joined to one another by link 120, through node 110 (Tom). Thus, link 120 emphasizes that a link extending between two nodes in one of the FIG. 1 networks can in fact be routed through, or traverses, one or more other nodes.

Referring further to FIG. 1, there is shown content network 122, likewise constructed as a relational graph. Content network 122 shows the nodes 124-138, which respectively represent multimedia objects or pieces of content. For example, node 124 can be particular audio content, node 126 can be a particular image, and nodes 128-132 can be particular music or sounds, recorded on a DVD or the like. Nodes 134, 136 and 138 can be respective video objects. FIG. 1 further shows links 142-148, which depict relationships or commonality links between particular groups of content nodes. An example of a content network 122 would be a media net in which digital content objects are the nodes, and the links or connections therebetween represent the relationships among the content objects. These relationships can refer, for example, to color similarity among image objects, to semantic content similarity among video objects, guitar sound similarity in audio tracks, or to other basis of grouping or clustering multiple content objects. As used herein, the term "semantic" refers to wording, phraseology or text used to describe video, audio and other multimedia content and objects. Generally, a link is established herein by determining that two entities joined by the link have a common, similar or identical relationship, feature or other data element.

After the social network 102 and the content network 122 are in place, cross network or hybrid links 140-144 can be constructed between certain user nodes and object nodes. For example, hybrid link 140, between user node 108 and audio content node 124, can be established by referring to the content access history of user node 102. Hybrid link 143 can be established by identifying content that has been published by user node 112. Hybrid link 145 can result from recommendations made to user node 110 (Tom) by other users.

It is to be understood that social and/or content networks are likely to pre-exist, and construction of respective links thereof is generally determined by system application. Herein, a link between the nodes in the social network, or between nodes in the content network, is referred to as an internal links, and a link extending between a social node and a content node is referred to as a hybrid link.

In an embodiment of the invention, a principal task is to analyze the internal links or relationships within the social and content networks, and also the hybrid links between nodes of both networks, in order to infer and detect possible new links or relationships between nodes, or to remove the links that are not supported (e.g. linking just based on the same school). In accordance with embodiments of the invention, a minimum set of four nodes is initially identified, two nodes in the social network and two in the content network, wherein the four nodes are linked together by three commonality links. At least one of the links must be a hybrid link, and at least one link must be an internal link. It then becomes necessary to determine whether an inferred fourth link, extending between two of the nodes in the initial set and forming a closed loop with the initial three commonality links, is in fact a valid commonality link. As used herein, a "commonality link" refers to a link between two nodes that arises because the nodes have in common, or share, a particular feature, characteristic, property or other data element. The fourth link may be subjected to a test procedure or the like, as described hereinafter, to positively confirm or reject the fourth link as being a commonality link.

Moreover, it is to be understood that the above minimum set of four nodes may in fact be part of a much larger structure comprising nodes and connecting links, wherein either the entire structure or a part thereof comprises or defines an open loop extending between two end nodes. The two end nodes are the two nodes that the inferred fourth link would extend between. Thus, if the fourth link is confirmed by the test procedure to be a valid commonality link between the two end nodes, the open loop defined by the structure would become a closed loop. If the inferred fourth link is proved to be invalid, the loop would remain open.

Figure 2:
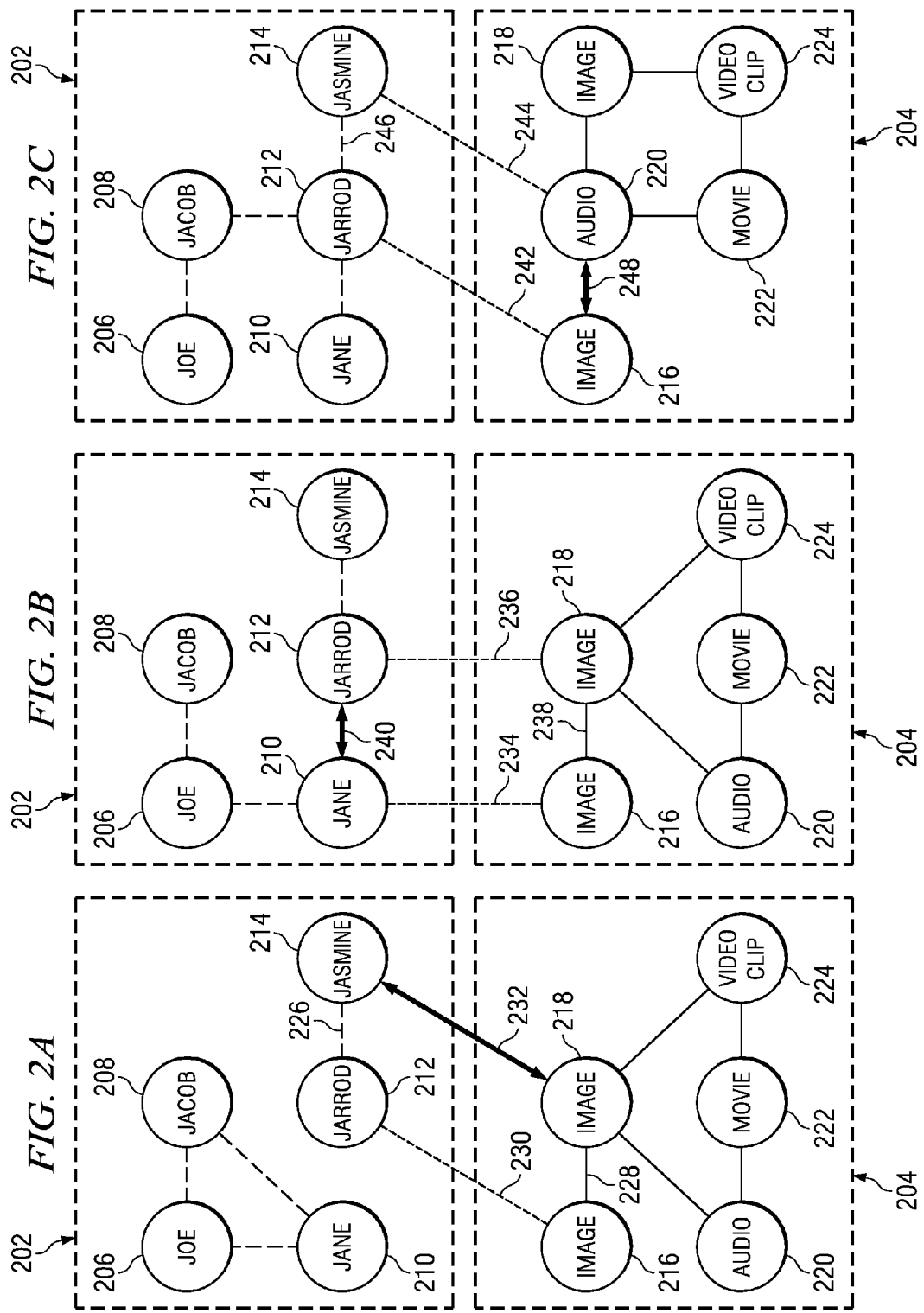
FIGS. 2A-2C are schematic diagrams illustrating the detection or inference of links in accordance with different applications of an embodiment of the invention.

Referring to FIGS. 2A-2C, there is shown a social network 202 and a content network 204, for illustrating several examples of the analysis task described above, in order to infer or detect new links between nodes. Social network 202 contains user nodes 206-214, and content network 204 contains content object nodes 216-224. In example (A) of FIG. 2A, internal links 226 and 228 and hybrid link 230, which join together nodes 212-214 and 216-218, are identified to be three commonality links as described above. Accordingly, an open loop that includes links 226, 228 and 230 can be closed by establishing a valid link 232 between user node 214 and content node 218. Thus, example (A) shows the establishment of a further link or connection 232 between the social and content networks. In this example, the two end nodes, as described above, would be nodes 214 and 218. FIG. 2A also illustrates how the set of nodes 212-214 and 216-218, which with links 226-230 define an open loop, is joined by other links into a larger structure that includes nodes 220-224.

Example (B) of FIG. 2B shows initially identified hybrid links 234 and 236, and an internal link 238 between content nodes 216 and 218. These links collectively join together nodes 216 and 218, 210 and 212. The loop formed by these links can be closed by a link 240 established between user nodes 210 and 212. Thus, example (B) shows establishment of an internal link that enhances relationships between user nodes of social network 202.

Example (C) of FIG. 2C shows initially identified hybrid links 242 and 244, and an internal link 246 between content nodes 212 and 214. These links collectively join together nodes 212 and 214, 216 and 220. The loop formed by these links is closed by a link 248 established between content nodes 216 and 220. Thus, example (C) shows establishment of an internal link that enhances relationships between the nodes of content network 204.

Example (A) of FIG. 2A further indicates that internal links between the nodes 206, 208 and 210 of social network 202 are not affected by any hybrid links or relationships with the content network 204. It is emphasized that a social network, as defined herein, can include or even require internal links between different user nodes that are not affected by any hybrid link established with a content network.

Figure 3:
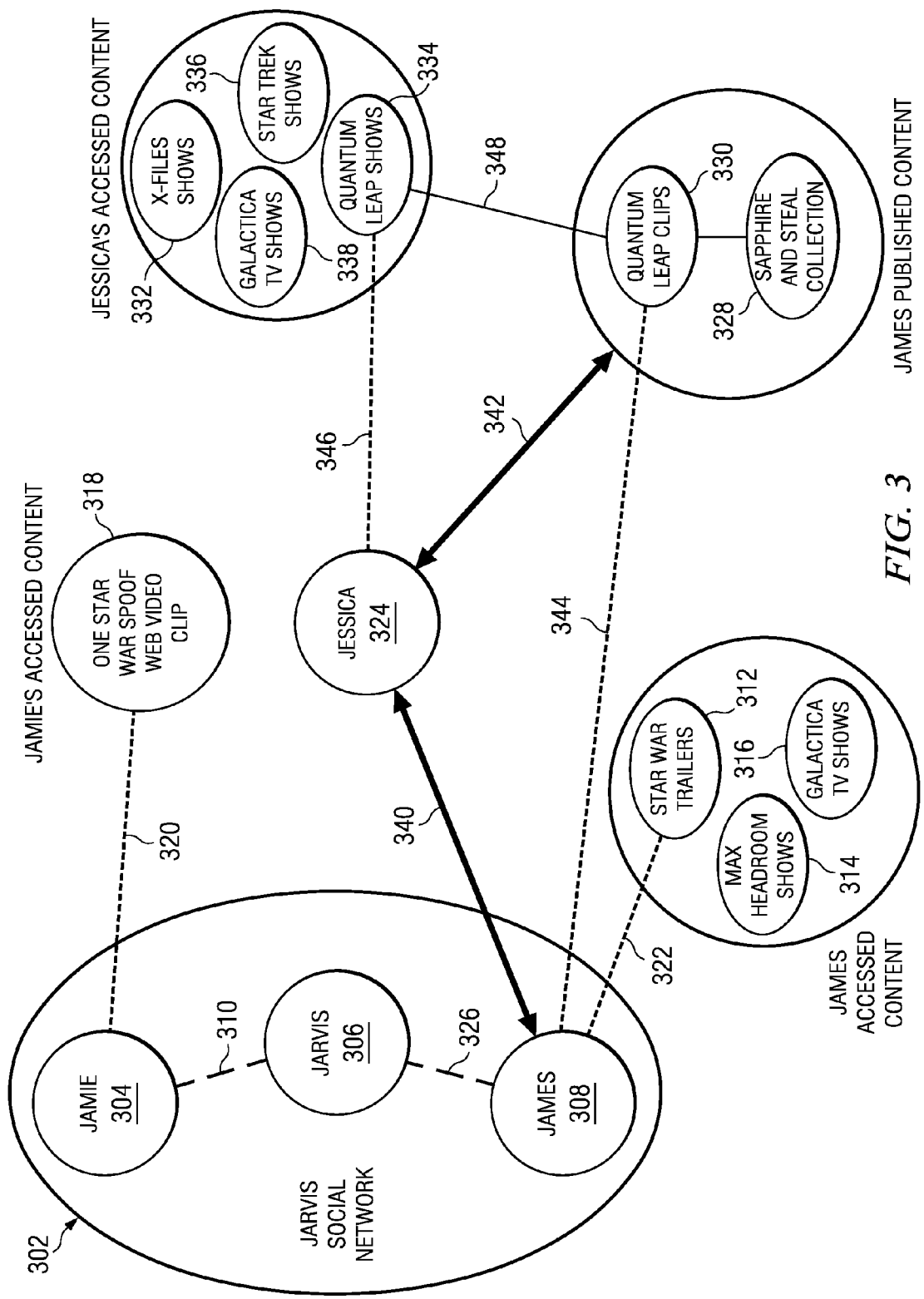
FIG. 3 is a schematic diagram showing further exemplary applications that may be carried out by an embodiment of the invention.

Referring to FIG. 3, there is shown a social network 302 comprising user nodes 304-308. Network 302 is referred to as the Jarvis social network, and such network includes Jarvis and others (e.g. James and Jamie) who are linked to Jarvis through friendships or other social connections. FIG. 3 further shows a content network that includes nodes 312-316 and 318, comprising video content items or objects that were previously accessed by James and Jamie, respectively. Social nodes 304 and 308, representing Jamie and James respectively, are internally linked through Jarvis to one another, by internal links 310 and 326. Node 304 is connected through a hybrid link 320 to content node 318, and node 308 is connected through a hybrid link 322 to respective nodes 312-316.

To illustrate a useful application of an embodiment of the invention, it is first noted that James and Jamie previously accessed content nodes 312 and 318, respectively, which both include the textual element "Star War". Accordingly, a recommendation system or collaborative filtering arrangement, as described above, would conclude that James and Jamie should be placed in a common pool relating to Star Wars. However, in accordance with an embodiment of the invention, a user-to-user link between James and Jamie, inferred from the hybrid links 320 and 322, is examined or tested further. The test procedure is carried out by comparing respective metadata or other elements of content nodes 312 and 318. By means of this additional procedure, it can be positively determined whether the inferred link between users James and Jamie is or is not valid. In this case, the examination discloses that there is no content similarity or metadata similarity between the video content of the node 318 and node 312. Jamie accessed a spoof Star Wars clip, whereas James accessed numerous Star Wars trailers and documentaries. Therefore, a Star Wars user link should not be established between the Jamie node 304 and the James node 308. This link between Jamie and James is effectively filtered out, and it is seen that they do not belong in a common Star Wars pool. It will be seen that this filtering out technique can be of great practical benefit, such as in efforts to target content users.

Referring further to FIG. 3, there is shown a user node 324 (Jessica), and a content network 326 that includes nodes 312-316 (James accessed content), nodes 328-330 (James published content) and nodes 332-338 (Jessica accessed content). As used herein, published content refers to content that a user makes available to others, such as by posting the content on a website, or being the original source of the content. James accesses nodes 312-316 by means of hybrid link 322, and accesses published content nodes 328-330 by means of hybrid link 344. Jessica accesses her content nodes 332-338 by means of hybrid link 346.

By comparing content nodes 332-338 of Jessica with content nodes 312-316 and 328-330 of James, it is determined from the overlap therebetween that they both definitely belong to a social network (which may also be a consumer interest group) comprising those who are very interested in science fiction. For example, content node 330 published by James is identical to content node 334 accessed by Jessica. Similarly, node 316 of James and node 338 of Jessica are identical. Thus, a link 340 is inferred and established between James and Jessica. Moreover, Jessica's interest in X-files, at node 332, indicates that she would also be interested in Sapphire and Steal, the content of node 328, which was a science fiction precursor to the X-files. This provides a further link 342 between user node 324 (Jessica) and content node 328 (James).

Figure 4:
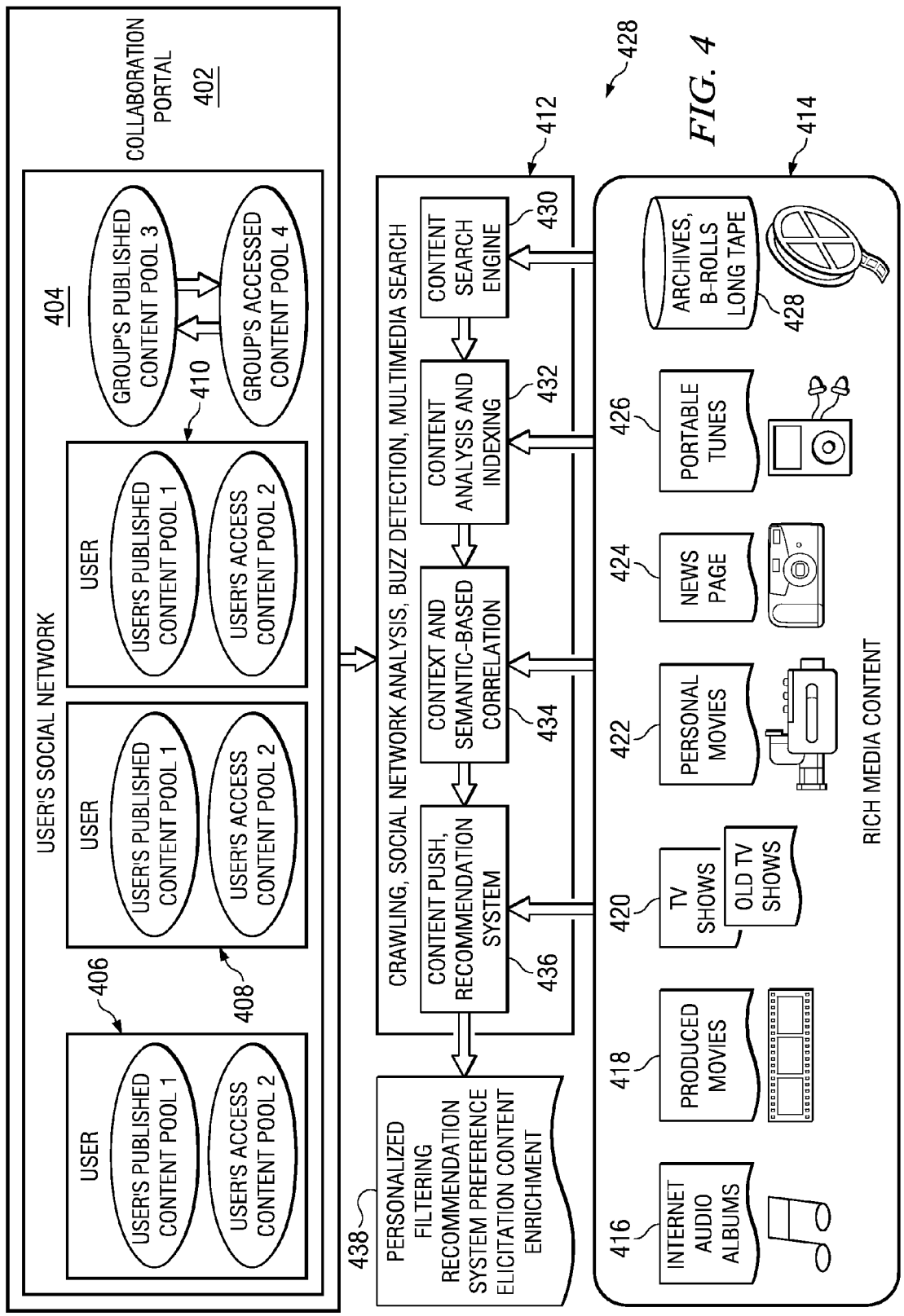
FIG. 4 is a schematic diagram illustrating tools and procedures that may be used for implementing embodiments of the invention.

Referring to FIG. 4, there is shown a collaboration portal 402 for providing network access to a social network of users 404. Social network 404 includes user nodes 406-410, which each can have two or more nodes for linking to content. More particularly, each user node has a first pool, comprising the total content which the user node has published, and a second pool comprising the total content that the user node has accessed. Moreover, the social network of the users in network 404 can have a third content pool comprising of the total content published by all user nodes. Similarly, the total content accessed by all user nodes of network 404, collectively, comprises a fourth content pool. It is thus seen that collaboration portal 402 has different levels for inferring hybrid linkages between social network 404 and a content network.

FIG. 4 further shows collaboration portal 402 connected to a processing center 412. Processing center 412 receives information pertaining to respective users of social network 404, and uses such information for different purposes such as (a) pulling relevant content links based on the social input and content links, (b) detecting and confirm internal links within network 404, that is, links between respective users thereof. This is also an example of final application. For example, processing center 412 may carry out social network analyses, wherein data elements of respective user profiles may be compared with one another, in order to detect commonalities and infer linkages or relationships between users. Processing center 412 may also crawl or visit respective user nodes, and follow website hyperlinks thereof in order to detect or infer links with other users. Further techniques for inferring links could include buzz detection and multimedia search. Buzz detection is a procedure wherein the passing of multimedia content links, and its access score generates additional information on how the specific content item is relevant to establish further social links between users who viewed it, or what is the emerging content genre that a particular social group becomes interested in.

FIG. 4 illustrates the linkage enrichment by integrating social and content network. Collaboration portal 402 is a social network of users connected at different levels through pools 404. Content network 414 is a pool of different multimedia items connected by content, context, or semantic similarity. Processing Center 412 provides a linkage between two networks, inferred and filters new links using context and semantic-based correlation of existing links enabled by embodiments of this invention, to allow applications like link enrichment and collaborative filtering in 438.

Content network or repository 414, which contains different types of multimedia content nodes and sources. For example, the content of repository 414 could include audio albums 416, commercially produced movies 418, television programs 420, personal movies 422, news items 424, portable music 426 and content archives 428. Information from respective content nodes is likewise furnished to processing center 412, which processes such information to detect or infer links between respective content nodes. For example, processing center 412 could operate a content search engine 430, in order to search for and detect similarities or matches between features and other data elements of different content nodes. Processing center 412 could also use content analysis and indexing 432 to find links between content nodes. Additionally, processing center 412 can enrich a multi-modal content node or information object contained in repository 414, by furnishing the object with specified semantic metadata.

After content links and user links have been identified, these links may be used together with known hybrid links to infer new links, and then either confirm or filter out the inferred links, as described above. Processing center 412 may be operated to perform these tasks by using context and semantic based correlation 434 of the links. For example, semantic elements (e.g. content descriptors, higher semantics, metadata, or tags) could be extracted from content nodes associated with the existing links. The semantic elements would then be correlated, to detect the presence or absence of the semantic elements in other nodes associated with the existing links. Correlation of a link could also be based on semantic scoring of related multi-modal content. Such semantic elements could comprise, for example, sites, scenes, objects, activities and generic or specific entities. For unstructured multi-modal information, contextual information could be correlated between different nodes, wherein the contextual information may comprise, for example, time, place, content, source, person, event, object, or scene information. Analysis could use contextual classification information that is either stored in a data base, or is packaged with unstructured multimedia information.

Content push and/or recommendation step is the final one in 436 that produced the desired output depending on the application 438.

Identifying new links within integrated social and content networks can provide a number of benefits, as described above and also as set forth in results 438 of FIG. 4. Such benefits can include eliciting user preferences for content, content enrichment, and improving systems for recommending content to users. Embodiments of the invention can also be adapted to positively conclude that certain links between specified nodes are not valid, and thus achieve personalized filtering.

Figure 5:
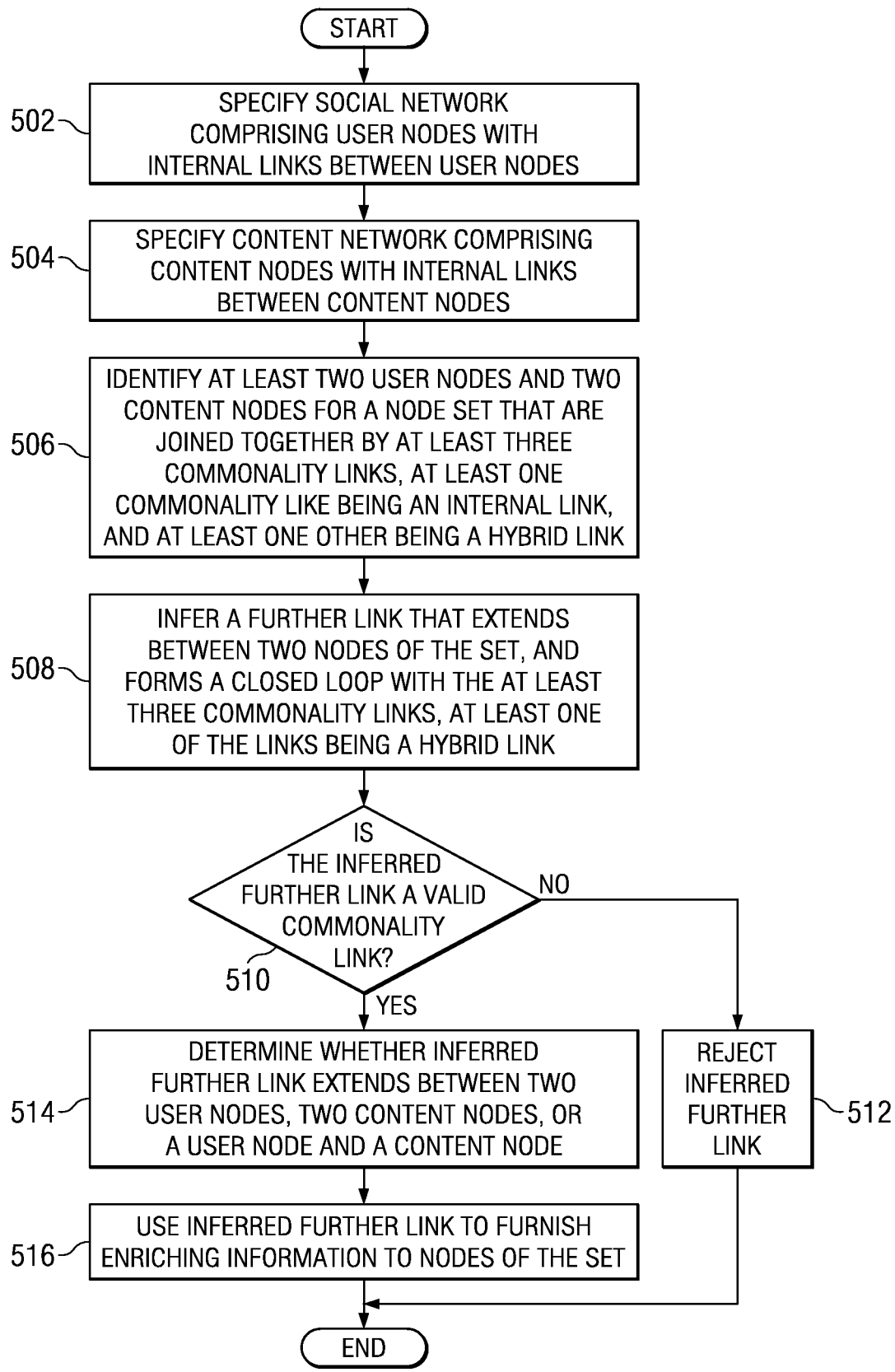
FIG. 5 is a flow chart showing principal steps for an embodiment of the invention.

Referring to FIG. 5, there is shown a flow chart summarizing principal steps for an embodiment of the invention. At step 502, a social network is specified, either by identifying a previously existing social network or by generating a new one. At step 504 a content network is specified, which similarly may be either a previously existing network or a newly created one. Each of these networks includes internal links between at least some of its nodes. Also, both networks may pertain to domains such as business, healthcare, entertainment, games, sports, and science domains, but are not limited thereto. Nodes of the networks include user and content nodes as described above, and nodes of the content network can include multimedia objects such as graphics, videos, images, music and other audio recordings, text, and games, but are not limited thereto.

At step 506, respective nodes of the social and content networks are respectively analyzed, to search for and identify a set of at least four nodes, including at least two user nodes and two content nodes, and also to identify a minimum of three commonality nodes that collectively join the at least four nodes of the set together. At least one of the three links is a hybrid link, and at least one is an internal link. Respective nodes and links therebetween are searched for by comparing appropriate data elements associated therewith, using for example techniques such as those described above. As also described above, the set of at least four nodes and associated links may be part of a much larger structure of nodes and interconnecting links.

For user nodes, the data elements may be items of information pertaining to the user profile. To identify hybrid links, data elements may be content items or objects that a user previously accessed or published. For content nodes, the searched data elements can be metadata or semantic elements such as sites, scenes, objects, events, activities, or generic or specific entities. For example, links between content nodes can be identified by using semantic extraction to detect the presence or absence of common semantic elements in the two nodes. For links between content nodes and user nodes, the search and analysis can be directed to context related to unstructured multi-modal information, such as time, place, content, source, provider, distributor, person, event, object or scene information.

At step 508, a further link is inferred as described above in connection with examples (A)-(C) of FIG. 2, where a minimum of one link of the set must be a hybrid link. At step 510, it is necessary to compare respective data elements of the two nodes connected by the inferred link. The inferred link is valid if the two data elements match, to within a pre-specified limit or other condition. If they do not match, the inferred link is rejected or filtered out, as shown by step 512.

For an inferred link between two media content nodes, validity or invalidity of the link could be determined by searching for a match between data elements of the two nodes that pertain to metadata or semantic elements, as described above. The search procedure could include a metric such as a minimum number of data element matches that had to be found, in order for the link to be valid. The procedure could also use semantic scoring of data elements. For a link between a content node, and a user node, validity could be determined by searching for matches between data elements of the content node, and data elements of content that had been published or accessed by the user.

For an inferred link between two user nodes, link validity could be evaluated as discussed above, in connection with FIG. 3. Such evaluations determined that a link between James node 304 and Jamie node 308 was not valid, whereas a link between James node 304 and Jessica node 324 was valid. These results were achieved by a more extensive comparison of the content associated with respective user nodes, than is typically used in current recommendation systems such as those described above. Evaluation may usefully require a metric for the content comparison process, such as requiring that at least 10 data elements from different content sources must match out of 100 considered.

It is to be emphasized that a procedure for determining that an inferred link is invalid could be very useful, such as in filtering out improper links between two user nodes, and between a user and object nodes.

As indicated by steps 514 and 516, if the inferred link is valid, it is determined whether the link establishes a new user-to-user, content-to-user or user-to-content relationship. This new relationships provides information that will enrich or enhance nodes associated with the new link, and will also enhance one or both of the networks.

Figure 6:
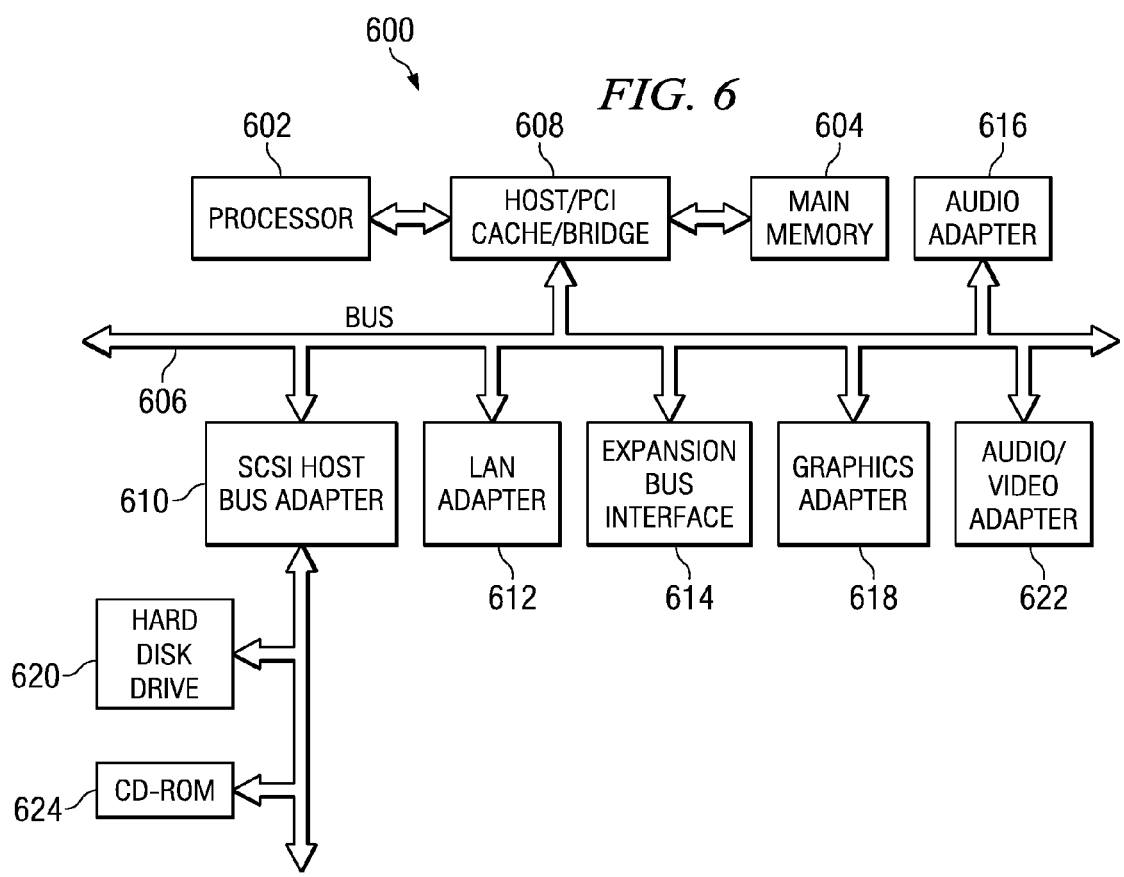
FIG. 6 is a block diagram showing a data processing system that may be used in implementing embodiments of the invention.

Referring to FIG. 6, there is shown a block diagram of a generalized data processing system 600 which may be adapted to implement embodiments of the invention described herein. It is to be emphasized, however, that the invention is by no means limited to such systems. For example, embodiments of the invention can also be implemented with a large distributed computer network and a service over the Internet, as may be applicable to distributed systems, LANs and WWWs.

Data processing system 600 exemplifies a computer, in which code or instructions for implementing embodiments of the invention may be located. Data processing system 600 usefully employs a peripheral component interconnect (PCI) local bus architecture, although other bus architectures such as Accelerated Graphics Port (AGP) and Industry Standard Architecture (ISA) may alternatively be used. FIG. 6 shows processor 602 and main memory 604 connected to PCI local bus 606 through Host/PCI Cache bridge 608. PCI bridge 608 also may include an integrated memory controller and cache memory for processor 602. It is thus seen that data processing system 600 is provided with components that may readily be adapted to provide other components for implementing embodiments of the invention as described herein. Referring further to FIG. 6, there is shown local area network (LAN) adapter 612, small computer system interface (SCSI) host bus adapter 610, and expansion bus interface 614 respectively connected to PCI local bus 606 by direct component connection. Audio adapter 616, graphics adapter 618, and audio/video adapter 622 are connected to PCI local bus 606 by means of add-in boards inserted into expansion slots. SCSI host bus adapter 610 provides a connection for hard disk drive 620, and also for CD-ROM drive 624.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for analyzing integrated social and content networks comprising the steps of:
   specifying a social network comprising multiple user nodes, at least some of the user nodes being joined to one another by one or more internal links;
   specifying a content network comprising multiple content nodes, wherein at least some of said content nodes comprise multimedia content, and said multimedia content nodes further comprise first multimedia content nodes and second multimedia content nodes, wherein the multimedia content of each first multimedia content node is of a type that is different from the multimedia content of each second multimedia content node, and at least a given one of said user nodes is joined to one of said first multimedia content nodes by a first hybrid link, and at least one user node other than said given user node is joined to one of said second multimedia content nodes by a second hybrid link;
   analyzing data elements associated with respective nodes of said user and content networks, in order to identify a set of nodes comprising at least first and second user nodes and at least a first multimedia content node and a second multimedia content node, wherein two of said nodes comprise end nodes;
   further analyzing said data elements to identify at least three commonality links that collectively join all the nodes of said set together into a structure that defines an open loop extending between said end nodes; and
   determining whether a further link is a valid commonality link, wherein said further link is initially inferred to extend between said two end nodes of said set, and to cooperatively join with said at least three identified commonality links to form a closed loop.

2. The method of claim 1, wherein:
said first user node comprises said given user node, and said second user node comprises said user node other than said given user node.

3. The method of claim 1, wherein:
said inferred further link extends between one of said user nodes and one of said content nodes, between said first and second user nodes, or between said first multimedia content node and said second multimedia content node, selectively.

4. The method of claim 1, wherein:
nodes of said set are selectively interconnected to other user or content nodes by means of other links; and
said determining step comprises comparing respective data elements of said two end nodes, wherein the validity of said inferred further link is rejected if said compared data elements fail to match one another to within a pre-specified limit, and the validity is otherwise confirmed.

5. The method of claim 1, wherein:
said analyzing step includes processing data elements comprising content objects that were previously published or accessed, selectively, by one of the user nodes of said set.

6. The method of claim 1, wherein:
said social network includes one or more internal links extending between different user nodes, wherein at least one or more of said internal user links is unaffected by any link established between any of said user nodes and any of said content nodes of said content network.

7. The method of claim 1, wherein:
one of said identified commonality links extends between two content nodes or between a user node and a content node, and is identified by an analysis of context related to unstructured multi-modal content information.

8. The method of claim 1, wherein:
at least one of said identified commonality links is identified by semantic scoring of data elements comprising semantic elements associated with at least one of the content nodes in said set.

9. The method of claim 1, wherein:
one of said commonality links is identified by extracting data elements comprising semantic elements, in order to detect the presence or absence of common semantic elements in said first content node and said second content node.

10. The method of claim 1, wherein:
said analyzing step uses contextual classification information that is selectively stored in a database, or is packaged with unstructured multi-modal information, selectively.

11. The method of claim 1, wherein:
said inferred further link, when determined to be valid, acts to furnish specified semantic metadata to a content node comprising a multi-modal information object.

12. The method of claim 1, wherein:
said analyzing step includes detecting a match between data elements of said first and second content nodes that comprise unstructured information content, wherein said unstructured information content includes at least image, video, audio or text information.

13. A computer program product in a non-transitory computer readable storage medium for analyzing integrated social and content networks, the computer program product comprising:
   first instructions for specifying a social network comprising multiple user nodes, at least some of the user nodes being joined to one another by one or more internal links;
   second instructions for specifying a content network comprising multiple content nodes, wherein at least some of the content nodes comprise multimedia content, and the multimedia content nodes further comprise first multimedia content nodes and second multimedia content nodes, wherein the multimedia content of each first multimedia content node is of a type that is different from the multimedia content of each second multimedia content node;
   third instructions for analyzing data elements associated with respective nodes of the user and content networks, in order to identify a set of nodes comprising at least first and second user nodes and at least a first multimedia content node and a second multimedia content node, wherein two of the nodes comprise end nodes;

fourth instructions for further analyzing the data elements to identify at least three commonality links that collectively join all the nodes of the set together, into a structure that defines a loop extending between the end nodes; and fifth instructions for determining whether a further link is a valid commonality link, wherein the further link is initially inferred to extend between the two end nodes of the set, and to cooperatively join with the at least three identified commonality links to form a closed loop.

14. The computer program product of claim 13, wherein:
determining whether said further link is valid comprises comparing respective data elements of two nodes, wherein the validity of said inferred further link is rejected if said compared data elements fail to match one another to within a pre-specified limit, and the validity is otherwise confirmed.

15. The computer program product of claim 13, wherein:
said inferred further link extends between one of said user nodes and one of said content nodes, between said first and second user nodes, or between said first content node and said second content node, selectively.

16. The computer program product of claim 13, wherein:
analyzing data elements includes processing data elements that comprise content objects which were previously published or accessed, selectively, by one of the user nodes of said set.

17. An apparatus for analyzing integrated social and content networks comprising:
a component for specifying a social network comprising multiple user nodes, at least some of the user nodes being joined to one another by one or more internal links;
a component for specifying a content network comprising multiple content nodes, wherein at least some of said content nodes comprise multimedia content, and said multimedia content nodes further comprise first multimedia content nodes and second multimedia content nodes, wherein the multimedia content of each first multimedia content node is of a type that is different from the multimedia content of each second multimedia content node:
a component for analyzing data elements associated with respective nodes of said user and content networks, in order to identify a set of nodes comprising at least first and second user nodes and at least a first multimedia content node and a second multimedia content node, wherein two of said nodes comprise end nodes;
a component for further analyzing said data elements to identify at least three commonality links that collectively join all the nodes of said set together, into a structure that defines an open loop extending between said end nodes; and
a component for determining whether a further link is a valid commonality link, wherein said further link is initially inferred to extend between said two end nodes of said set, and to cooperatively join with said at least three identified commonality links to form a closed loop.

18. The apparatus of claim 17, wherein:
said determining component compares respective data elements of the two end nodes, wherein the validity of said inferred further link is rejected if said compared data elements fail to match one another to within a pre-specified limit, and the validity is otherwise confirmed.

19. The apparatus of claim 17, wherein:
said further inferred link extends between one of said user nodes and one of said content nodes, between said first and second user nodes, or between said first content node and said second content node, selectively.

20. The apparatus of claim 17, wherein:
said analyzing component processes data elements comprising content objects that were previously published or accessed, selectively, by one of the user nodes of said set.

* * * * *